(12) United States Patent
Han et al.

(10) Patent No.: US 8,130,327 B2
(45) Date of Patent: Mar. 6, 2012

(54) CHANNEL CHANGER IN A VIDEO PROCESSING APPARATUS AND METHOD THEREOF

(75) Inventors: Kum-yon Han, Suwon-si (KR); Mi-young Yoo, Suwon-si (KR); Min-gu Kang, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1336 days.

(21) Appl. No.: 11/602,210

(22) Filed: Nov. 21, 2006

(65) Prior Publication Data

US 2007/0121019 A1 May 31, 2007

(30) Foreign Application Priority Data

Nov. 28, 2005 (KR) ........................ 10-2005-0114399

(51) Int. Cl.
*H04N 5/445* (2011.01)
*H04N 5/50* (2006.01)
*H04N 5/44* (2011.01)
(52) U.S. Cl. ......... 348/731; 348/563; 348/569; 348/734
(58) Field of Classification Search .................. 348/563, 348/569, 570, 705, 706, 731, 732, 734
See application file for complete search history.

(56) References Cited

U.S. PATENT DOCUMENTS

| | | | | | |
|---|---|---|---|---|---|
| 5,376,970 | A | * | 12/1994 | Amano | 348/569 |
| 5,452,023 | A | * | 9/1995 | Kim | 348/731 |
| 5,933,192 | A | * | 8/1999 | Crosby et al. | 375/240.25 |
| 6,285,414 | B1 | * | 9/2001 | Chilamakuri | 348/734 |
| 6,505,346 | B2 | * | 1/2003 | Saib et al. | 725/38 |
| 6,519,011 | B1 | * | 2/2003 | Shendar | 348/731 |
| 6,529,246 | B1 | * | 3/2003 | Maeda | 348/570 |
| 6,598,233 | B1 | * | 7/2003 | Choi | 725/151 |
| 6,710,815 | B1 | * | 3/2004 | Billmaier et al. | 348/515 |
| 6,710,816 | B1 | * | 3/2004 | Minami | 348/554 |
| 6,766,526 | B1 | * | 7/2004 | Ellis | 725/57 |

(Continued)

FOREIGN PATENT DOCUMENTS

EP 0821523 A2 1/1998

(Continued)

OTHER PUBLICATIONS

Communication dated Mar. 18, 2011 issued by the European Patent Office in counterpart European Application No. 06124672.4.

*Primary Examiner* — Brian Yenke
(74) *Attorney, Agent, or Firm* — Sughrue Mion, PLLC

(57) ABSTRACT

A video processing apparatus, comprises a signal receiving part receiving a video signal through one of a plurality of channels, a user inputting part in which the channel is selected and inputted by a user, a video processing part processing the video signal received by the signal receiving part, and a controller controlling the signal receiving part to start receiving a video signal through a first channel upon the first channel selection among the plurality of channels by the user, and to start receiving a video signal through a second channel upon the second channel selection among the plurality of channels by the user, wherein the second channel selection is made during the receiving process of the first channel.

Thus, the present invention provides a video processing apparatus and a video processing method capable of performing a channel change rapidly to solve the above-described problem.

22 Claims, 4 Drawing Sheets

U.S. PATENT DOCUMENTS

| | | | |
|---|---|---|---|
| 6,836,297 B2 * | 12/2004 | Maeda | 348/569 |
| 6,985,188 B1 * | 1/2006 | Hurst, Jr. | 348/553 |
| 7,084,930 B2 * | 8/2006 | Okabe | 348/731 |
| 7,113,230 B1 * | 9/2006 | Genovese et al. | 348/731 |
| 7,562,375 B2 * | 7/2009 | Barrett et al. | 725/38 |
| 7,589,789 B2 * | 9/2009 | Choi | 348/441 |
| 7,692,727 B2 * | 4/2010 | Yoon | 348/732 |
| 7,847,865 B2 * | 12/2010 | Hasegawa | 348/725 |
| 7,884,883 B2 * | 2/2011 | Kondo et al. | 348/563 |
| 2001/0015771 A1 * | 8/2001 | Kishimoto et al. | 348/705 |
| 2002/0113895 A1 | 8/2002 | Takagi et al. | |
| 2002/0171775 A1 | 11/2002 | Okabe | |
| 2003/0016944 A1 * | 1/2003 | Kato | 386/46 |
| 2004/0003399 A1 * | 1/2004 | Cooper | 725/38 |
| 2004/0181813 A1 * | 9/2004 | Ota et al. | 725/131 |
| 2004/0189879 A1 * | 9/2004 | Read | 348/731 |
| 2004/0194134 A1 * | 9/2004 | Gunatilake et al. | 725/38 |
| 2005/0207449 A1 * | 9/2005 | Zhang et al. | 370/486 |
| 2006/0075428 A1 * | 4/2006 | Farmer et al. | 725/38 |
| 2006/0085828 A1 * | 4/2006 | Dureau et al. | 725/100 |
| 2007/0171306 A1 * | 7/2007 | Lowet et al. | 348/565 |
| 2009/0102984 A1 * | 4/2009 | Arling et al. | 348/734 |

FOREIGN PATENT DOCUMENTS

| | | |
|---|---|---|
| JP | 2005065007 A | 3/2005 |
| JP | 2005-94451 A | 4/2005 |
| JP | 2005-142827 A | 6/2005 |
| KR | 10-2000-0002892 A | 1/2000 |
| KR | 2002-0093275 A | 12/2002 |
| KR | 10-2004-0052075 A | 6/2004 |

* cited by examiner

CHANNEL CHANGER IN A VIDEO PROCESSING APPARATUS AND METHOD THEREOF

CROSS-REFERENCE TO RELATED APPLICATIONS

This application claims priority from Korean Patent Application No. 2005-0114399, filed on Nov. 28, 2005, in the Korean Intellectual Property Office, the disclosure of which is incorporated herein by reference.

BACKGROUND OF INVENTION

1. Field of Invention

The present invention relates to a video processing apparatus and a video processing method, and more particularly, to a video processing apparatus and a video processing method capable of performing a channel change rapidly.

2. Description of the Related Art

A video processing apparatus like TV and a set-top box for TV receives a video signal such as public broadcasting, cable broadcasting, and satellite broadcasting, performs video-processing suitable for the received video signal, and displays a video based on the processed video signal. The video processing apparatus receives a video signal through one of a plurality of channels which is selected by a user. The process in which the video processing apparatus receives a video signal through one of the plurality of channels is called tuning.

FIG. 1 is a flow diagram illustrating a video signal tuning operation performed by a conventional video processing apparatus. As shown in FIG. 1, a user selectively inputs one of a plurality of channels through an inputting device like a remote control (not shown) in a video processing apparatus (S11). Here, it is assumed that a channel is selected through a channel up/down button provided in the remote control.

The video processing apparatus displays a channel number indicating a selected channel on a display part (not shown), for example, in the form of an OSD (on-screen display) so that the user can recognize which channel is selected (S12). The video processing apparatus tries to perform tuning with regard to a video signal of the selected channel (S13). The video processing apparatus performs tuning with reference to a frequency corresponding to the selected channel.

Next, the video processing apparatus determines whether the tuning for the video signal of the selected channel is finished (S14). When it is determined that the tuning is not finished, it continues to perform tuning. When the tuning is determined to be finished, the video processing apparatus performs video processing suitable for the tuned video signal and displays a video based on the processed video processing on a display part (S15). Then, the video processing apparatus returns to the first stage and repeats the same operations according to a channel selection by the user.

However, according to the conventional video processing apparatus, until tuning suitable for the video signal of the selected channel is finished after a user selects one of the channels, a new channel selection by the user is not considered. Accordingly, in the case that a channel is sequentially selected by pressing a channel up or down button sequentially, for example, the newly selected channel is ignored while tuning suitable for the video signal of the first selected channel is performed. Hence, there is a problem that the operation of such a conventional video processing apparatus is not suitable for sequential channel changing in a rapid manner, especially in a broadcasting environment like digital broadcasting having increased number of channels to choose from.

SUMMARY OF THE INVENTION

It is therefore an aspect of the invention to provide a video processing apparatus and a video processing method capable of performing a channel change rapidly to solve the above-described problem.

Additional aspects of the present general inventive concept will be set forth in part in the description which follows and, in part, will be obvious from the description, or may be learned by practice of the general inventive concept.

The foregoing and/or other aspects of the present invention can be achieved by providing a video processing apparatus, comprising a signal receiving part receiving a video signal through one of a plurality of channels, a user inputting part in which the channel is selected and inputted by a user, a video processing part processing the video signal received by the signal receiving part, and a controller controlling the signal receiving part to start receiving a video signal through a first channel upon the first channel selection among the plurality of channels by the user, and to start receiving a video signal through a second channel upon the second channel selection among the plurality of channels by the user, wherein the second channel selection is made during the receiving process of the first channel.

According to an aspect of the present invention, the video processing apparatus is a television receiver.

According to an aspect of the present invention, said television receiver further comprises of a display screen.

According to an aspect of the present invention, said television receiver is a cable broadcast receiver.

According to an aspect of the present invention, the start of receiving of the video signal through a second channel occurs before a start of display of OSD indicating the first channel number and/or name.

According to an aspect of the present invention, the start of receiving the video signal through the second channel occurs after a predetermined time reference has passed from the time when the first channel was selected by the user.

According to an aspect of the present invention, the predetermined reference time is equal to at least the time required for the OSD, indicating the first channel number and/or name, to be displayed on a display screen after the selection of the first channel by the user.

According to an aspect of the present invention, the predetermined reference time is less than the time required for the OSD, indicating the first channel number and/or name, to be displayed on a display screen after the selection of the first channel by the user.

According to an aspect of the present invention, the predetermined reference time is selectable by the user According to an aspect of the present invention, the selection of the predetermined reference time is made through an OSD.

According to an aspect of the present invention, the video processing apparatus further comprises an OSD generating part generating OSD data indicating the channel for the video signal, wherein the video processing part processes the OSD data so that a video based on the OSD data generated by the OSD generating part can be displayed, and the controller controls the OSD generating part and the video processing part so that a video based on the OSD data corresponding to a channel selected by the user can be displayed.

The foregoing and/or other aspects of the present invention can be achieved by providing a video processing method, comprising determining whether a first channel is selected among a plurality of channels by a user, starting receiving of a video signal through the first channel upon the selection of the first channel, determining whether a second channel is selected among the plurality of channels by the user, starting receiving a video signal through the second channel upon the second channel selection, and processing a video signal received through the second channel wherein the second channel selection is made during the receiving process of the first channel.

According to an aspect of the present invention, the video processing method is incorporated in a television receiver.

According to an aspect of the present invention, said television receiver further comprises of a display screen.

According to an aspect of the present invention, said television receiver is a cable broadcast receiver.

According to an aspect of the present invention, the start of receiving of the video signal through a second channel occurs before a start of display of OSD indicating the first channel number and/or name.

According to an aspect of the present invention, the start of receiving the video signal through the second channel occurs after a predetermined time reference has passed from the time when the first channel was selected by the user.

According to an aspect of the present invention, the predetermined reference time is equal to at least the time required for the OSD, indicating the first channel number and/or name, to be displayed on a display screen after the selection of the first channel by the user.

According to an aspect of the present invention, the predetermined reference time is less than the time required for the OSD, indicating the first channel number and/or name, to be displayed on a display screen after the selection of the first channel by the user.

According to an aspect of the present invention, the predetermined reference time is selectable by the user.

According to an aspect of the present invention, the selection of the predetermined reference time is made through an OSD.

According to an aspect of the present invention, the video processing method further comprises generating OSD data indicating the channel, and processing the OSD data so that a video based on the generated OSD data can be displayed.

The foregoing and/or other aspects of the present invention can be achieved by providing a video processing method, comprising determining whether a first channel is selected among a plurality of channels by a user, receiving a video signal through the first channel, determining whether a second channel is selected among the plurality of channels by the user during the receiving process of the first channel, receiving a video signal through the second channel in accordance with the determination of the second channel selection, and processing a video signal received through the second channel, wherein the receiving of the video signal through the second channel occurs predetermined reference time after the selection of the first channel by the user.

According to an aspect of the present invention, the predetermined reference time is equal to at least the time required for the OSD, indicating the first channel number and/or name, to be displayed on a display screen after the selection of the first channel by the user.

BRIEF DESCRIPTION OF THE DRAWINGS

The above and/or other aspects and advantages of the prevent invention will become apparent and more readily appreciated from the following description of the exemplary embodiments, taken in conjunction with the accompany drawings, in which.

Figure 1:
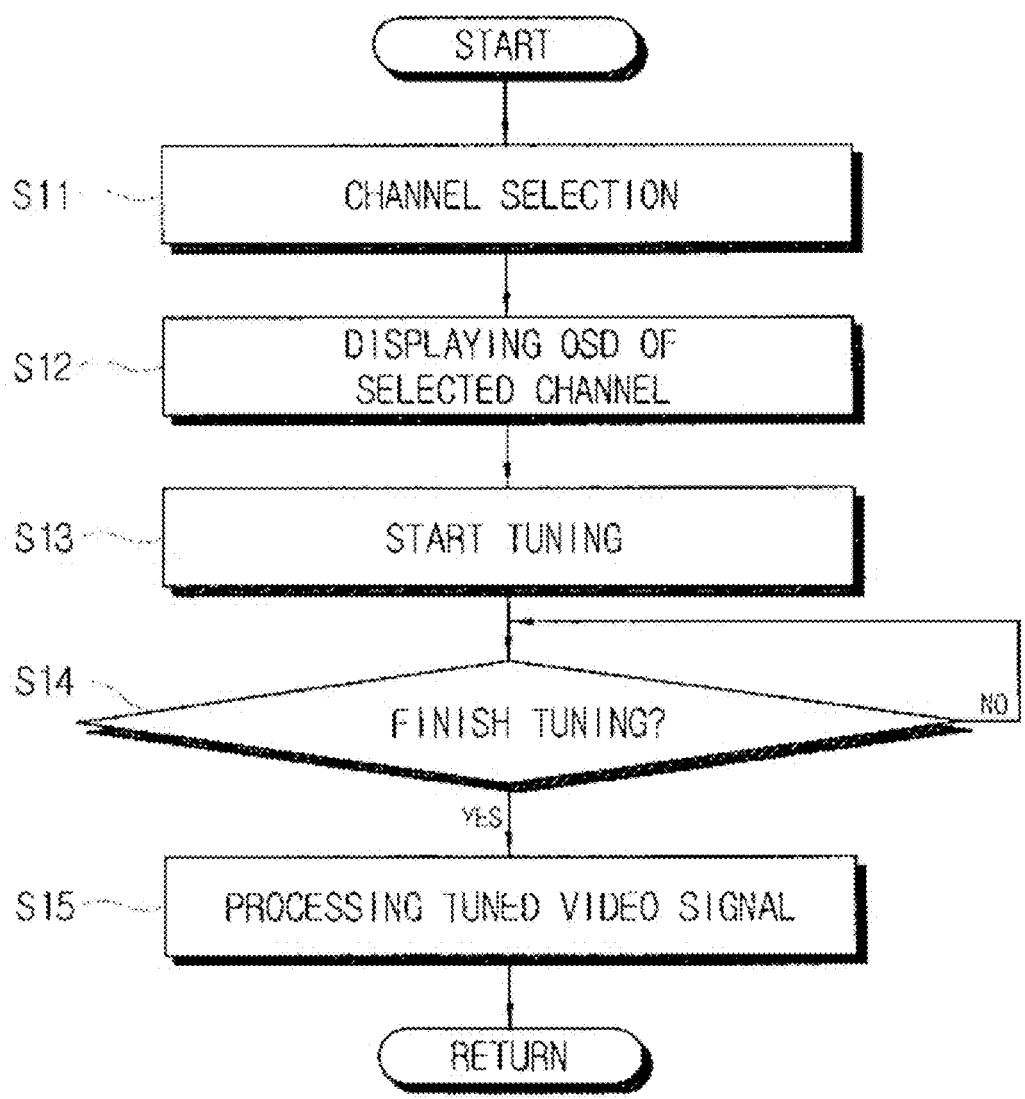
FIG. 1 is a flow diagram illustrating a video signal tuning operation performed by a conventional video processing apparatus.

DETAILED DESCRIPTION OF THE ILLUSTRATIVE, NON-LIMITING EMBODIMENTS OF THE INVENTION

Reference will now be made in detail to the embodiments of the present invention, examples of which are illustrated in the accompanying drawings, wherein like reference numerals refer to like elements throughout. The embodiments are described below so as to explain the present invention by referring to the figures.

The same elements are given the same reference numerals in various embodiments, and their description may be omitted in some embodiments.

Figure 2:
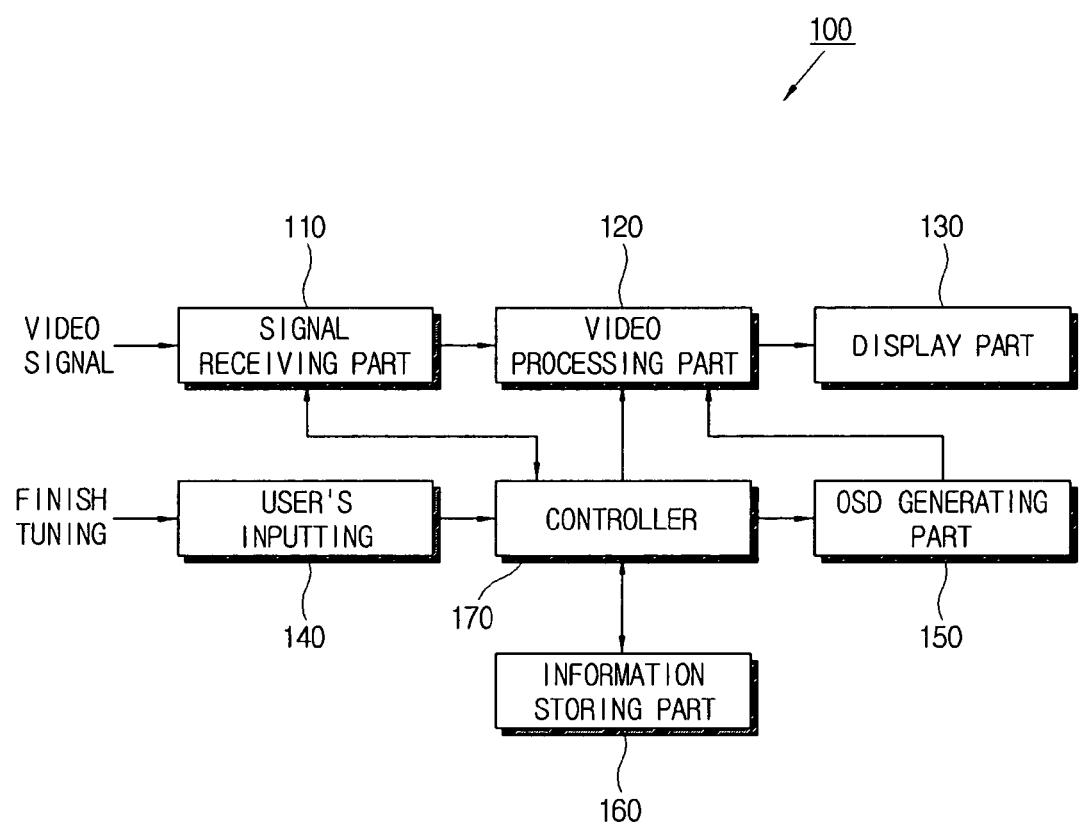
FIG. 2 is a block diagram illustrating a configuration of a video processing apparatus according to an embodiment of the present invention.

FIG. 2 is a block diagram illustrating a configuration of a video processing apparatus 100 according to an embodiment of the present invention. The video processing apparatus 100 receives a video signal for public broadcasting, cable broadcasting, satellite broadcasting or the like and performs video processing suitable for the received video signal to display a video based on the processed video signal. The video processing apparatus 100 may be provided as TV, set-top boxes or the like.

As shown in FIG. 2, the video processing part 100 comprises a signal receiving part 110, a video processing part 120, a display part 130, a user inputting part 140, an OSD generating part 150, an information storing part 160, and a controller 170.

The signal receiving part 110 receives a video signal of public broadcasting, cable broadcasting, satellite broadcasting or the like. The signal receiving part 110 may be provided as a tuner. The signal receiving part 110 performs tuning of video signals corresponding to one of a plurality of channels. The signal receiving part 110 starts and finishes tuning the video signal for a channel selected by a user according to control by the controller 170. The signal receiving part 110 performs tuning a video signal with reference to a frequency corresponding to the channel selected by a user.

The video processing part 120 processes the video signal so that a video can be displayed on the display part 130 according to the video signal received by the signal receiving part 110. For example, the video processing part 120 can perform decoding for extracting video information from the inputted video signal, scaling for controlling resolution of the video signal decoded according to a characteristic of the display part 130 and user's setting, and processing for enhancing a video signal quality (referred to as a picture enhancement). The video processing part 120 is preferable to perform a video processing suitable for the characteristics of an inputted video signal and the display part 130.

In the display part 130 is displayed a video based on the video signal processed by the video processing part 120. The display part 130 may be provided as a CRT (cathode ray tube), an LCD (liquid crystal display), a PDP (plasma display panel), a DLP (digital light processing) display, an OLED (organic light-emitting diode), an SED (surface-conduction electron-emitter display) and an FED (field emission display) or other types of displays.

In the user inputting part 140 is inputted a command by a user. In the user inputting part 140 is inputted one of a plurality of channels selected by a user. The user inputting part 140 may be provided with a button corresponding to one of the plurality of channels and/or a channel change (increasing or decreasing). The user inputting part 140 may be provided as a remote control or an operation panel.

The OSD generating part 150 generates OSD data indicating the plurality of channels. The OSD data can indicate channel numbers and channel names. In this case, the video processing part 120 video-processes the OSD data so that a video based on the OSD data generated by the OSD generating part 150 can be displayed on the display part 130 according to control of the controller 170. In the information storing part 160 is stored data needed for an operation of the controller 170.

The controller 170 entirely controls the video processing apparatus 100. The controller 170 controls the OSD generating part 150 and the video processing part 120 to display the OSD of the selected channel when a user selects and inputs a channel, and controls the signal receiving part 110 to start tuning of the video signal for the selected channel. In the case that the user selects a new channel during tuning, the controller 170 determines whether a predetermined reference time has passed since a previous channel was selected. When the new channel is determined to be selected after the predetermined reference time has passed, the controller 170 controls the signal receiving part 110 to stop the present tuning and to start tuning a video signal tuning for the new channel.

The predetermined reference time may be set to have a value which is equal to or greater than the time necessary for the OSD, indicating the channel number/name of the previous channel, to be displayed in the display part 130; hereinafter referred to as OSD delay time. Given so, the controller 170 ignores user's input of new channel until the OSD indicating the channel number/name of the previous channel is displayed to the user, thereby allowing the user to acknowledge the previous channel number/name before accepting channel change to a new channel. Furthermore, the predetermined reference time may be set to have a value with is less than the OSD delay time. Given so, the controller 170 accepts user's input of new channel, and starts the process for changing to the new channel before the OSD is displayed. Still furthermore, the predetermined reference time may be set to zero, in effect eliminating the feature of delaying the acceptance timing of new channel during the sequential channel change.

Determination of the OSD delay time may depend on the particular parts used in the apparatus incorporating the present invention. Actual OSD delay time may be calculated from the known specification or may be measured through testing.

The predetermined reference time may be stored in the information storing part 160 to have a value which is at least the OSD delay time, less than the OSD delay time or zero. Alternately, the predetermined reference time may be set by the user. In this case, the OSD generating part 150 is preferable to generate the OSD data of a user interface which can set the predetermined reference time so as to have an option of displaying the channel number/name of the previous channel before accepting sequential channel up/down command or accepting sequential channel up/down command immediately after accepting channel change command of the previous channel.

When the tuning of the video signal is finished, the controller 170 controls the video processing part 120 to perform video processing for the tuned video signal and to display a video based on the processed video signal on the display part 130. The controller 170 according to the embodiment of the present invention may be provided as a computer program operated by a microprocessor such as a CPU.

Figure 3:
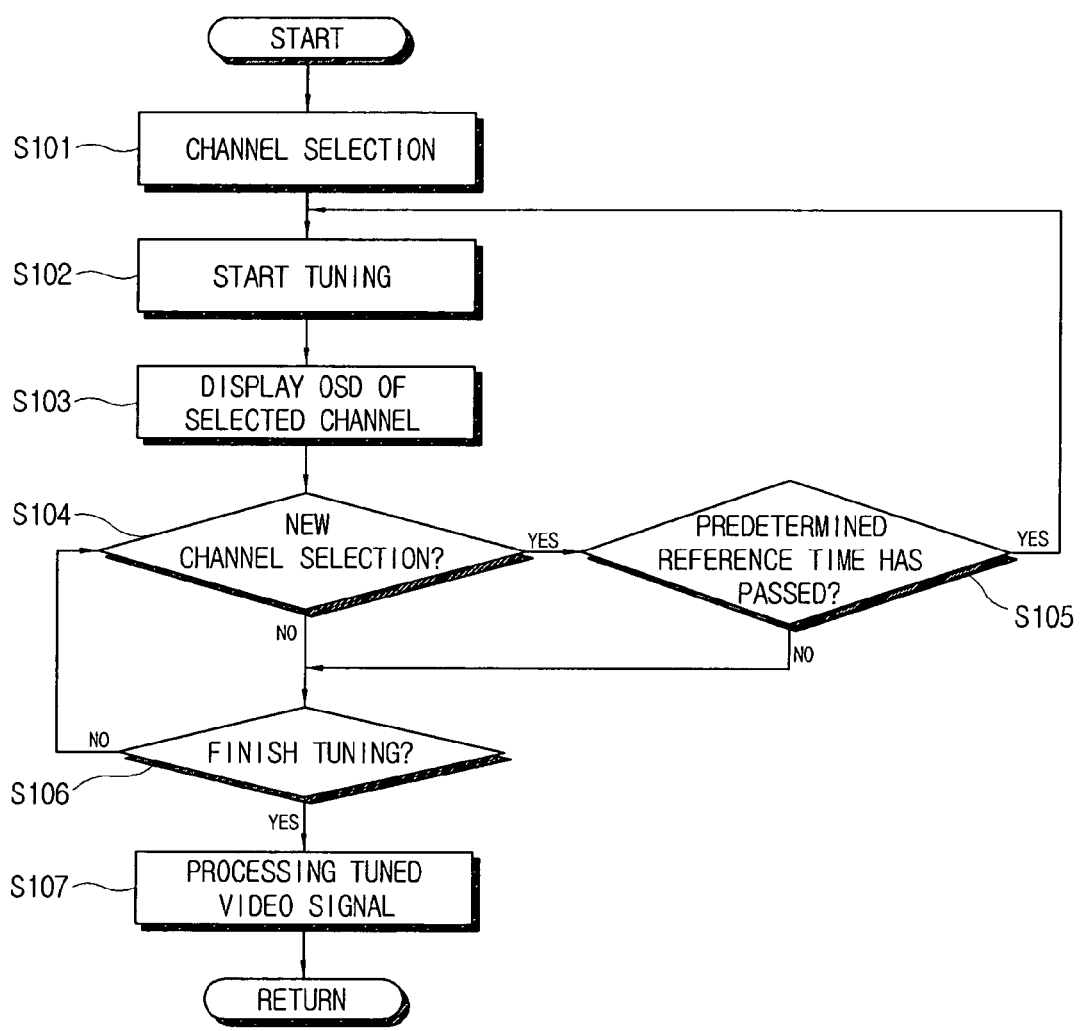
FIG. 3 is a flow diagram illustrating a video processing method according to an embodiment of the present invention.

FIG. 3 is a flow diagram illustrating a video processing method according to the present invention. First, one of a plurality of channels is selected by a user (S101) Then, upon the channel selection by the user, tuning for the video signal of the selected channel starts (S102). Next, a channel number indicating the selected channel is displayed on a display part as the shape of OSD (S103).

Next, it is determined whether a new channel is selected by the user (S104). When it is determined that the new channel is selected, it is determined whether a predetermined reference time has passed since a previous channel was selected (S105). When it is determined that the predetermined reference time has passed, tuning for the previous channel is stopped, the newly selected channel number is displayed on the OSD (S102), and tuning for the video signal of the newly selected channel starts S103.

When it is determined that the predetermined reference time has not passed at the stage of S105 or the user does not select the new channel at the stage of S104, it is determined whether the tuning of the present channel is finished (S106). When determined that the tuning is not finished, it is determined whether a new channel is selected by the user while tuning is being performed (S104) When it is determined that the tuning is finished, video processing for the tuned video signal is performed and the video is displayed on the display part (S107). Next, the video processing apparatus returns to the first stage and repeats the stages S102 through S107 when a channel is selected by the user S101.

Figure 4:
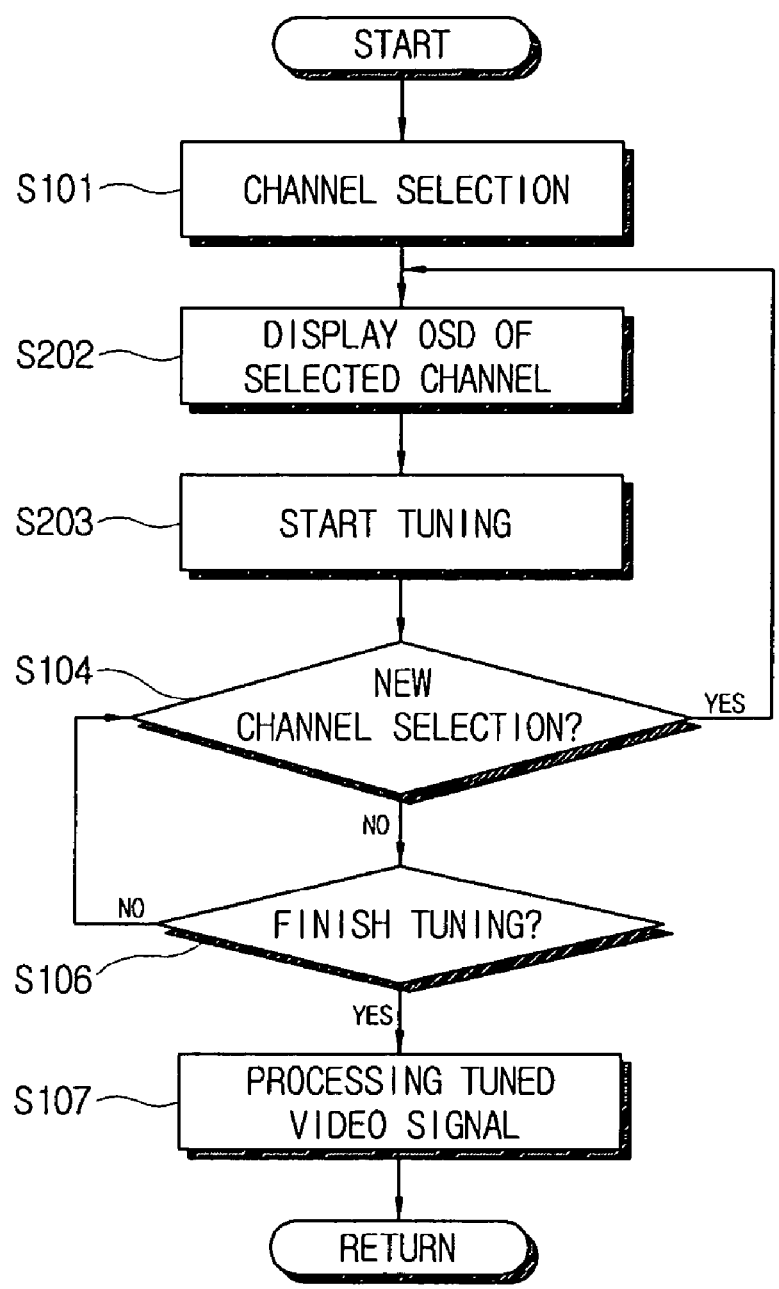
FIG. 4 is a flow diagram illustrating a video processing method according to another embodiment of the present invention.

FIG. 4 is a flow diagram illustrating the video processing method according to another embodiment of the present invention. The steps are similar to FIG. 3 except S105, S202, and S203. That is, in this embodiment, the step for determining whether the predetermined time has passed, after the channel selection command of the previous channel, is not performed. Therefore, upon new channel selection, the process returns to the step for displaying the new channel (S202) and start of tuning for the new channel (S203).

The video processing apparatus according to the present invention is not limited to TV, but may be applied to a set-top box for TV or any other types of devices incorporating a television tuner having a channel changing function. In this case, the display part 130 in the above described embodiment may be omitted. Also, the OSD generating part 150 may be omitted in some cases.

As described above, according to the present invention, there is provided a video processing apparatus and a video processing method capable of performing a channel change rapidly.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A video processing apparatus, comprising:
a signal receiving part receiving a video signal through one of a plurality of channels;
a user inputting part in which the channel is selected and inputted by a user;
a video processing part processing the video signal received by the signal receiving part; and
a controller controlling the signal receiving part to start receiving a video signal through a first channel upon the first channel selection among the plurality of channels by the user, to stop receiving the video signal through the first channel, and to start receiving a video signal through a second channel upon the second channel selection among the plurality of channels by the user;
wherein the second channel selection is made during the receiving process of the first channel,
wherein if the second channel selection is made within a predetermined reference time from the time when the first channel was selected by the user and tuning to the first channel is not completed upon the second channel selection, the second channel selection is ignored,
wherein if the tuning to the first channel is completed within the predetermined reference time, the start of receiving the video signal through the second channel occurs when the second channel selection is made after the tuning to the first channel is completed, and
wherein if the tuning to the first channel is not completed within the predetermined reference time, the start of receiving the video signal through the second channel occurs upon the second channel selection after the predetermined reference time has passed.

2. The video processing apparatus according to claim 1, wherein the video processing apparatus is a television receiver.

3. The video processing apparatus according to claim 2, wherein said television receiver further comprises a display screen.

4. The video processing apparatus according to claim 2, wherein said television receiver is a cable broadcast receiver.

5. The video processing apparatus according to claim 2, wherein the start of receiving of the video signal through a second channel occurs before a start of display of OSD indicating the first channel number and/or name.

6. The video processing apparatus according to claim 2, wherein the predetermined reference time is equal to at least the time required for the OSD, indicating the first channel number and/or name, to be displayed on a display screen after the selection of the first channel by the user.

7. The video processing apparatus according to claim 2, wherein the predetermined reference time is less than the time required for an OSD, indicating the first channel number and/or name, to be displayed on a display screen after the selection of the first channel by the user.

8. The video processing apparatus according to claim 2, wherein the predetermined reference time is selectable by the user.

9. The video processing apparatus according to claim 8, wherein the selection of the predetermined reference time is made through an OSD.

10. The video processing apparatus according to claim 1, further comprising an OSD generating part generating OSD data indicating the channel for the video signal,
wherein the video processing part processes the OSD data so that a video based on the OSD data generated by the OSD generating part can be displayed, and
the controller controls the OSD generating part and the video processing part so that a video based on the OSD data corresponding to a channel selected by the user can be displayed.

11. A video processing method, comprising:
determining whether a first channel is selected among a plurality of channels by a user;
starting receiving of a video signal through the first channel upon the selection of the first channel;
determining whether a second channel is selected among the plurality of channels by the user;
stopping receiving the video signal through the first channel, and starting receiving a video signal through the second channel upon the second channel selection; and
processing a video signal received through the second channel
wherein the second channel selection is made during the receiving process of the first channel,
wherein if the second channel selection is made within a predetermined reference time from the time when the first channel was selected by the user and tuning to the first channel is not completed upon the second channel selection, the second channel selection is ignored,
wherein if the tuning to the first channel is completed within the predetermined reference time, the starting of receiving the video signal through the second channel occurs when the second channel selection is made after the tuning to the first channel is completed, and
wherein if the tuning to the first channel is not completed within the predetermined reference time, the starting of receiving the video signal through the second channel occurs upon the second channel selection after the predetermined reference time has passed.

12. The video processing method according to claim 11, wherein the video processing method is incorporated in a television receiver.

13. The video processing method according to claim 12, wherein said television receiver further comprises of a display screen.

14. The video processing method according to claim 12, wherein said television receiver is a cable broadcast receiver.

15. The video processing method according to claim 12, wherein the start of receiving of the video signal through a second channel occurs before a start of display of OSD indicating the first channel number and/or name.

16. The video processing method according to claim 12, wherein the predetermined reference time is equal to at least the time required for the OSD, indicating the first channel number and/or name, to be displayed on a display screen after the selection of the first channel by the user.

17. The video processing method according to claim 12, wherein the predetermined reference time is less than the time required for the OSD, indicating the first channel number and/or name, to be displayed on a display screen after the selection of the first channel by the user.

18. The video processing method according to claim 12, wherein the predetermined reference time is selectable by the user.

19. The video processing method according to claim 18, wherein the selection of the predetermined reference time is made through an OSD.

20. The video processing method according to claim 11, further comprising:
generating OSD data indicating the channel; and
processing the OSD data so that a video based on the generated OSD data can be displayed.

21. A video processing method, comprising:
determining whether a first channel is selected among a plurality of channels by a user;
receiving a video signal through the first channel;
determining whether a second channel is selected among the plurality of channels by the user during the receiving process of the first channel;
stopping receiving the video signal through the first channel and receiving a video signal through the second channel in accordance with the determination of the second channel selection; and
processing a video signal received through the second channel;
wherein if the second channel selection is made within a predetermined reference time from the time when the first channel was selected by the user and tuning to the first channel is not completed upon the second channel selection, the second channel selection is ignored,
wherein if the tuning to the first channel is completed within the predetermined reference time, the receiving of the video signal through the second channel occurs when the second channel selection is made after the tuning to the first channel is completed, and
wherein if the tuning to the first channel is not completed within the predetermined reference time, the receiving of the video signal through the second channel occurs upon the second channel selection after the predetermined reference time after.

22. The method according to claim 21, wherein the predetermined reference time is equal to at least the time required for the OSD, indicating the first channel number and/or name, to be displayed on a display screen after the selection of the first channel by the user.

* * * * *